Dec. 10, 1968    E. H. STAU ET AL    3,414,965
BLIND RIVET ASSEMBLY AND METHOD OF MAKING AND USING SAME
Filed April 20, 1964
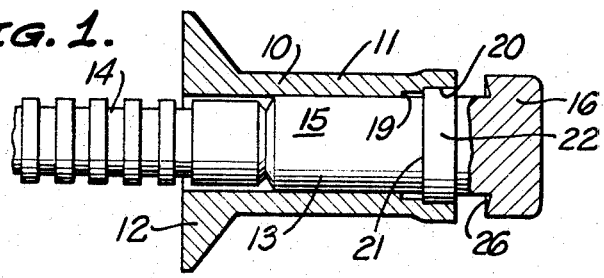
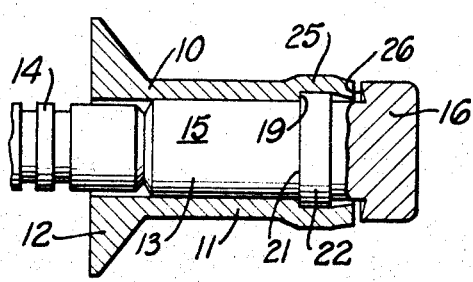
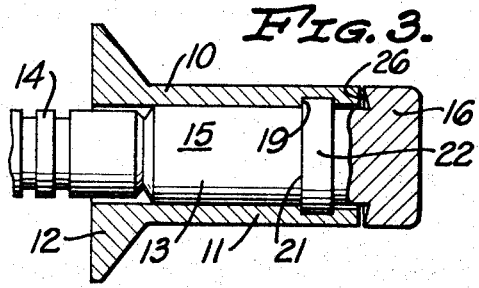
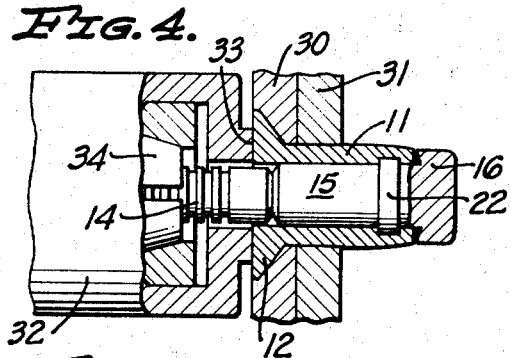
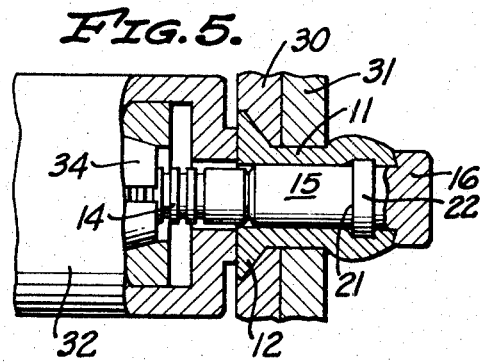
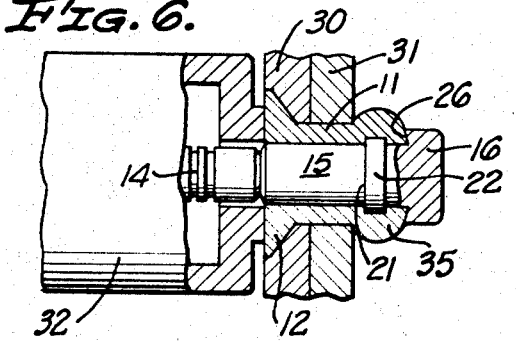
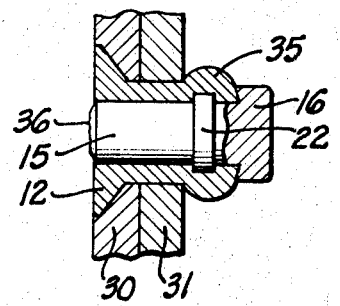
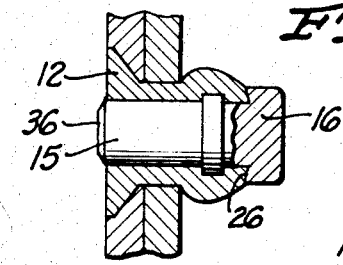
INVENTORS
ELVERT H. STAU,
GEORGE SIEBOL
BY THEIR ATTORNEYS
HARRIS, KIECH, RUSSELL & KERN United States Patent Office 3,414,965
Patented Dec. 10, 1968

3,414,965
BLIND RIVET ASSEMBLY AND METHOD OF
MAKING AND USING SAME
Elvert H. Stau, Alhambra, and George Siebol, Garden
Grove, Calif., assignors to Olympic Screw & Rivet
Corporation, Downey, Calif., a corporation of
California
Filed Apr. 20, 1964, Ser. No. 361,084
7 Claims. (Cl. 29—509)

This invention relates to new and improved blind rivet assemblies and methods of making and setting blind rivet assemblies.

Blind rivet assemblies are well known and widely used and a typical article is shown in U.S. Patent No. 2,931,532. Inventors are continually seeking rivet designs which provide increased clamping forces, larger clamping areas and improved locking characteristics. It is an object of the present invention to provide a new and improved blind rivet assembly which may be directly substituted for present-day rivet assemblies and which can be set utilizing conventional setting tools while providing a marked improvement in the rivet holding characteristics. A particular object is to provide such a blind rivet assembly which when set provides a substantial increase in the area of the clamping material on the blind side by producing greater blind side bulbing of the sleeve.

It is a particular object of the invention to provide a blind rivet assembly in which pulling of the pin in the rivet produces a column compression load on the sleeve to provide radial expansion of the sleeve intermediate the ends for hole filling and substantial lateral buckling of the sleeve adjacent the end generating a large clamping area.

It is an object of the invention to provide a blind rivet assembly for joining plates having aligned holes and including a tubular rivet with a sleeve and an enlarged head for positioning within the aligned holes with the head engaging one side of the plates and with the sleeve projecting from the opposite side of the plates, and a pin positioned within the rivet and having a body joining a pulling stem projecting from the head end of the rivet and a blind head projecting from the other end of the rivet, with the pin body fitted within the sleeve and having an annular shoulder projecting outward into engagement with a mating shoulder within the sleeve. A further object is to provide such a structure with the shoulders engageable for producing a column load on the sleeve and upsetting or buckling of the sleeve end as the pin is pulled.

It is a particular object of the invention to provide such a blind rivet assembly in which a portion of the sleeve is initially flared by pulling of the pin into the rivet, when the flared sleeve then being radially compressed about the pin body. An additional object is to provide such a structure wherein the flared sleeve is compressed into a substantially cylindrical shape in alignment with the pin head.

It is an object of the invention to provide a new and improved method for making such a rivet assembly including the steps of moving the pin body into the rivet sleeve a short distance to expand a portion of the sleeve and then radially compressing the expanded sleeve about the pin body.

It is an object of the invention to provide a new and improved method of setting a blind rivet assembly including the step of applying a column compression load to the sleeve by pulling on the stem for expanding the sleeve intermediate the ends thereof.

The invention also comprises novel details of construction which will more fully appear in the course of the following description. The drawing merely shows and the description merely describes a preferred embodiment of the present invention which is given by way of illustration or example.

In the drawing:

FIG. 1 is a sectional view showing the pin positioned within the rivet;

FIG. 2 is a view similar to that of FIG. 1 showing an intermediate step in the manufacture of the rivet assembly;

FIG. 3 is a view similar to FIG. 1 showing the completed rivet assembly;

FIG. 4 is a sectional view showing the rivet assembly of FIG. 3 partially set by a riveting gun in a pair of plates which are to be joined;

FIG. 5 is a view similar to that of FIG. 4 showing a further setting position;

FIG. 6 is a view similar to that of FIG. 4 showing the rivet assembly fully set;

FIG. 7 is a view similar to that of FIG. 6 with the broken stem and gun removed; and FIG. 8 is a view similar to that of FIG. 7 showing the set rivet with thinner plates.

Three steps in the manufacture of the rivet assembly are shown in FIGS. 1, 2 and 3. The rivet assembly includes a tubular rivet 10 having a sleeve 11 and an enlarged head 12, which is shown here as a countersunk head. Of course, the invention is equally applicable to be used of button heads and all other types of heads. The rivet assembly also includes a pin 13 having a pulling stem 14, a body 15, and a head 16.

The rivet 10 is provided with a shoulder 19 within the sleeve 11, the shoulder preferably being the annular planar bottom of a counterbore 20. The head 16 of the pin is preferably substantially the same size as the sleeve 10 of the rivet in order to obtain the maximum head diameter for the particular size opening for which the rivet assembly is designed. A shoulder 21 is provided on the body 15 of the pin for engaging the shoulder 19 of the rivet, the pin shoulder preferably being formed as an annular rib 22 carried on the body and spaced from the head 16.

The rib 22 is a slight interference fit with the counterbore 20 of the sleeve. The pin is positioned within the rivet and is pulled or pressed into the rivet, as by means of a conventional blind rivet setting tool, causing a flaring or expansion of the sleeve as seen in FIG. 1. The pin movement is continued until the pin shoulder 21 engages the rivet shoulder 19, as seen in FIG. 2. The flared end portion 25 tends to pull in behind the rib 22. This expanded portion is then radially compressed, as by crimping or rolling, to reduce the diameter of the flared portion substantially to that of the remainder of the sleeve and to bring the end of the sleeve into position for engagement by the end 26 of the pin head 16. The rivet assembly now has the configuration substantially as shown in FIG. 3. The flared portion 25 of the sleeve does not have to be reduced to the exact diameter of the remainder of the sleeve but it is preferred to so reduce the diameter in order to provide maximum sleeve material for filling a particular hole size. The end 26 of the pin head 16 is preferably made slightly concave, as best seen in FIG. 1. With this form, the end of the sleeve is urged inward as the pin is pulled in the setting operation to be described.

The rivet 10 is normally annealed and is of softer material than the pin 15. The portion of the sleeve 11 which is compressed about the rib 22 is work-hardened to a harder state than the remainder of the rivet.

The completed rivet assembly of FIG. 3 may be used for joining a pair of plates 30, 31 by positioning the rivet assembly in aligned openings of the plates, as shown in FIG. 4. A setting tool 32 is positioned around the pulling stem 14 with the anvil 33 engaging the rivet head 12 and with the chuck jaws 34 gripping the stem 14.

A pulling force is now applied to the stem producing a column compression load on the sleeve by engagement of the pin shoulder 21 and sleeve shoulder 19, expanding the sleeve to fill the openings in the plates, as seen in FIG. 4. Continued pulling on the stem produces shearing at the sleeve shoulder and starts the bulbing of the sleeve. The pulling also brings the head 16 of the pin into engagement with the end of the sleeve 11, aiding the buckling or bulbing of the exposed end portion of the sleeve. The resulting bulbed end 35 of the rivet provides an increased gripping area on the blind side of the riveted plates. Also, the compression of some of the rivet sleeve material into the area between the rib 22 and head 16 of the pin provides a mechanical lock for holding the pin in the rivet.

When the pin is pulled to the set position as shown in FIG. 6, the pulling stem is broken off in the usual manner leaving the pin end 36 substantially flush with the rivet head (FIG. 7).

The axial compression and resultant radial expansion of the sleeve provides satisfactory hole filling for various thicknesses of plates, permitting a wider grip range for a particular size rivet assembly. A set rivet assembly in a thinner pair of plates is seen in FIG. 8.

The rivet assembly of the present application is utilized in the same manner as conventional blind rivet assemblies and the workman doing the riveting does not require any additional instructions or different tools. In fact, the workman need not even know that the rivet assembly differs from the conventional.

Although an exemplary embodiment of the invention has been disclosed and discussed, it will be understood that other applications of the invention are possible and that the embodiment disclosed may be subjected to various changes, modifications and substitutions without necessarily departing from the spirit of the invention.

We claim as our invention:

1. In a blind rivet assembly for joining plates having aligned holes, the combination of:
    a tubular rivet having a sleeve and an enlarged head for positioning within the aligned holes with said head engaging one side of the plates and with the sleeve projecting from the opposite side of the plates, with said sleeve having an internal shoulder facing and spaced from the sleeve end opposite said head and with said shoulder disposed outside the plates being joined; and
    a pin positioned within said rivet and having a body joining a pulling stem projecting from the head end of said rivet and a blind head projecting from the other end of said rivet;
    with said pin body fitted within said sleeve and having an annular shoulder projecting outward into engagement with said shoulder within said sleeve and with sad blind head of said pin spaced from said other end of said rivet sleeve.

2. In a blind rivet assembly for joining plates having aligned holes, the combination of:
    a tubular rivet having a sleeve and an enlarged head for positioning within the aligned holes with said head engaging one side of the plates and with the sleeve projecting from the opposite side of the plates, with said sleeve having an internal shoulder facing and spaced from the sleeve end opposite said head with said shoulder disposed outside the plates being joined; and
    a pin positioned within said rivet and having a body joining a pulling stem projecting from the head end of said rivet and a blind head projecting from the other end of said rivet;
    with said pin body fitted within said sleeve and having an annular shoulder projecting outward into engagement with said shoulder within said sleeve and with said blind head of said pin spaced from said other end of said rivet sleeve, producing a column load on said sleeve as said pin is pulled; and
    with said sleeve work-hardened in the area around said shoulder of said pin.

3. In a blind rivet assembly for joining plates having aligned holes, the combination of:
    a tubular rivet having a sleeve and an enlarged head for positioning within the aligned holes with said head engaging one side of the plates and with the sleeve projecting from the opposite side of the plates, with said sleeve having an internal shoulder facing and spaced from the sleeve end opposite said head; and
    a pin positioned within said rivet and having a body joining a pulling stem projecting from the head end of said rivet and a blind head projecting from the other end of said rivet;
    with said pin body fitted within said sleeve and having an annular shoulder projecting outward into engagement with said shoulder within said sleeve and with said blind head of said pin spaced from said other end of said rivet sleeve;
    with the end portion of said sleeve radially compressed about said pin body adjacent said pin head.

4. In a blind rivet assembly for joining plates having aligned holes, the combination of:
    a tubular rivet having a sleeve and an enlarged head for positioning within the aligned holes with said head engaging one side of the plates and with the sleeve projecting from the opposite side of the plates; and
    a pin positioned within said rivet and having a body joining a pulling stem projecting from the head end of said rivet and a blind head projecting from the other end of said rivet;
    with said pin body fitted within said sleeve and having an annular rib spaced from the blind head thereof and projecting outward into engagement with a mating groove within said sleeve with said sleeve and pin head being substantially cylindrical for insertion into the aligned holes and with said blind head of said pin spaced from the end of said sleeve.

5. In a blind rivet assembly for joining plates having aligned holes, the combination of:
    a tubular rivet having a sleeve and an enlarged head for positioning within the aligned holes with said head engaging one side of the plates and with the sleeve projecting from the opposite side of the plates; and
    a pin positioned within said rivet and having a body joining a pulling stem projecting from the head end of said rivet and a blind head projecting from the other end of said rivet;
    with said pin body fitted within said sleeve and having an annular rib spaced from the blind head thereof and projecting outward into engagement with a mating groove within said sleeve producing a column load on said sleeve as said pin is pulled;
    with the end portion of said sleeve radially compressed about said pin body adjacent said pin head producing a substantially cylindrical sleeve and pin head for insertion into the aligned holes; and
    with the body end of said pin head concave and spaced from and engageable with the end of said sleeve.

6. A method of making a blind rivet assembly comprising a tubular rivet having a sleeve and head and a pin having a head, body and pulling stem, with the rivet sleeve having an internal shoulder facing and spaced from the sleeve end opposite the rivet head, and with the pin body having an outwardly projecting shoulder, including the steps of:
    positioning the pin within the rivet with the stem projecting beyond the rivet head;
    advancing the pin body into the rivet sleeve and moving the pin shoulder into the sleeve and toward the sleeve shoulder to expand a portion of the sleeve leaving the pin head spaced from the rivet sleeve; and
    radially compressing the expanded sleeve about said shoulder on the pin body.

7. A method of setting a blind rivet assembly in a panel assembly, with the rivet assembly comprising a tubular rivet having a sleeve and head and a pin carried within the rivet and having a head, body and pulling stem, with the rivet sleeve having an internal shoulder facing and spaced from the sleeve end opposite the rivet head, and with the pin body having an outwardly projecting shoulder engagable with the sleeve shoulder while said pin head is spaced from the end of said sleeve including the steps of:
  inserting the sleeve of the rivet assembly into the aligned holes of the panel assembly bringing the rivet head into engagement with a panel; and
  applying a column compression load to the sleeve in a radial zone beyond the panel assembly and spaced from the end of the sleeve at the engagement of the sleeve and pin shoulders by pulling on the stem for moving said shoulder on said pin body against said radial shoulder in said sleeve to expand said sleeve within said aligned holes and then moving said pin head against the end of the sleeve for expanding the sleeve intermediate the ends thereof.

References Cited

UNITED STATES PATENTS

| | | | |
|---|---|---|---|
| Re. 24,363 | 10/1957 | Curtis | 85—77 X |
| 1,994,210 | 3/1935 | Chobert | 85—77 X |
| 2,005,087 | 6/1935 | Kamack | 29—512 X |
| 2,030,169 | 2/1936 | Huck | 85—72 X |
| 2,030,170 | 2/1936 | Huck | 85—72 X |
| 2,061,628 | 11/1936 | Huck | 85—70 X |
| 2,061,629 | 11/1936 | Huck | 85—78 X |
| 2,319,376 | 5/1943 | Wallace | 85—75 |
| 2,371,423 | 3/1945 | Buchet | 85—77 |
| 2,371,452 | 3/1945 | Lees | 85—77 X |
| 2,525,736 | 10/1950 | Taylor | 85—70 |
| 2,538,623 | 1/1951 | Keating | 85—78 |
| 2,656,730 | 10/1953 | Mitchell | 29—512 X |
| 3,007,364 | 11/1961 | Dickie | 85—70 X |
| 3,047,181 | 7/1962 | Heidenwolf | 85—78 X |

FOREIGN PATENTS 1,241,123   8/1960   France.

CHARLIE T. MOON, *Primary Examiner.*

U.S. Cl. X.R.

10—27; 29—510, 517, 523; 85—77